United States Patent [19]

Fujita

[11] Patent Number: 5,031,165

[45] Date of Patent: Jul. 9, 1991

[54] OPTICAL INFORMATION RECORDING/REPRODUCING APPARATUS

[75] Inventor: Teruo Fujita, Nagaokakyo, Japan

[73] Assignee: Mitsubishi Danki Kabushiki Kaisha, Tokyo, Japan

[21] Appl. No.: 315,792

[22] PCT Filed: Jun. 21, 1988

[86] PCT No.: PCT/JP88/00613

§ 371 Date: Feb. 16, 1989

§ 102(e) Date: Feb. 16, 1989

[30] Foreign Application Priority Data

Jun. 23, 1987 [JP] Japan .................................. 62-154566

[51] Int. Cl.$^5$ .................... G11B 7/095; G11B 7/24; G11B 7/00
[52] U.S. Cl. ............................ 369/44.13; 369/44.28; 369/44.23; 369/44.11
[58] Field of Search ............... 369/44.28, 44.25, 44.13, 369/44.23, 44.38, 105

[56] References Cited

U.S. PATENT DOCUMENTS

| 4,271,334 | 6/1981 | Yardy | 369/44.13 |
| 4,621,351 | 11/1986 | Baer et al. | 369/44.25 |
| 4,866,688 | 9/1989 | Ohtake et al. | 369/44.28 |

Primary Examiner—Roy N. Envall, Jr.
Assistant Examiner—Hindi Nabil
Attorney, Agent, or Firm—Wolf, Greenfield & Sacks

[57] ABSTRACT

The present is to provide an optical information recording/reproducing apparatus which includes a multi-beam optical head extremely reducible of generation of a tracking offset caused by the inclination of a disc or track follow-up, so that the spot-wobbling method and the push-pull method are used to fetch a tracking error signal with respect to one reading light beam, the reading light beam being tracking-controlled by use of the tracking error signal obtained by the spot-wobbling method and then the tracking control for other light beams is performed by use of both the tracking error signal obtained by the push-pull method and that obtained by the push-pull method with respect to the reproducing light beam.

19 Claims, 10 Drawing Sheets

OPTICAL INFORMATION RECORDING/REPRODUCING APPARATUS

FIELD OF THE INVENTION

The present invention relates to an optical information recording/reproducing apparatus for irradiating a reproducing beam and a recording beam onto an information recording medium, and more particularly to an optical information recording/reproducing apparatus improving the tracking performance.

BACKGROUND OF THE INVENTION

Figure 9:
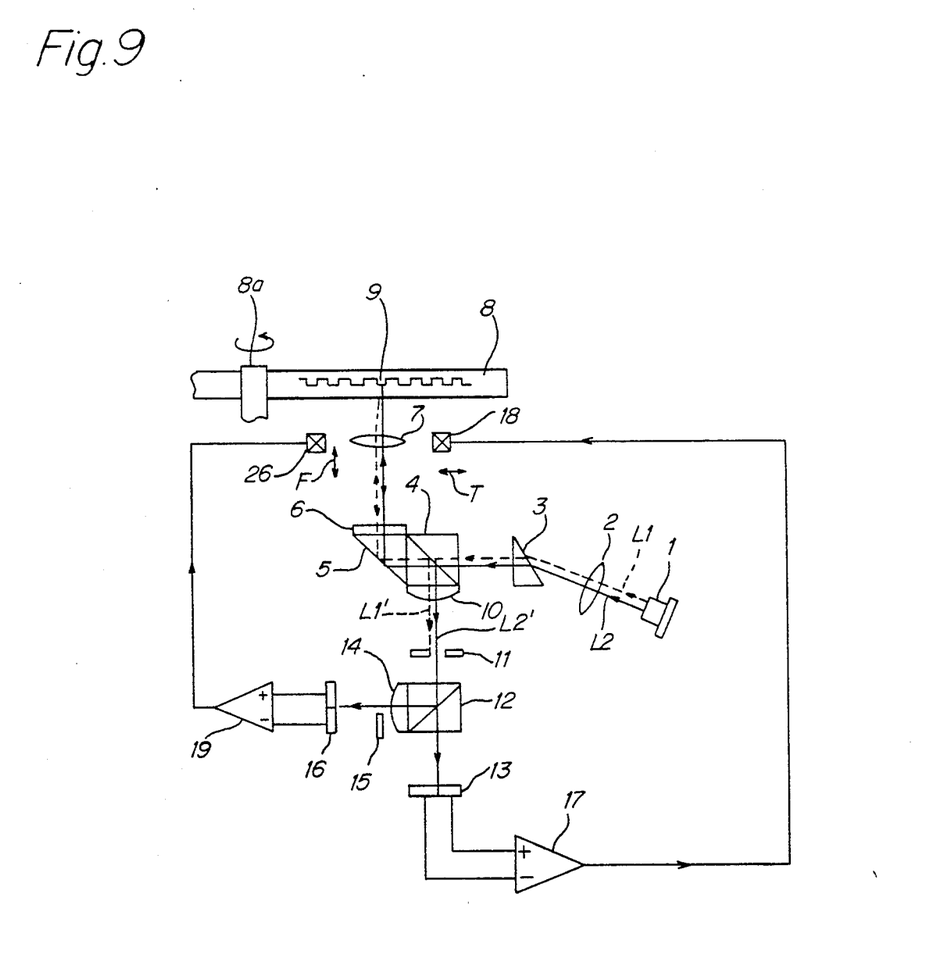
FIG. 9 is a structural view of the conventional optical information recording/reproducing apparatus.

FIG. 9 is a structural view of the conventional optical information recording/reproducing apparatus described on Pages 58 through 62—"LD Array Head For DRAW"—of "Micro-Optics News" (Vol. 3, No. 1, edited on Feb. 4, 1985) by Ito and Ohta.

Referring to FIG. 9, reference numeral 1 designates a semiconductor laser array emitting two light beams of recording beam L1 of high intensity of light and reproducing beam L2 of low intensity of light, 2 designates a collimator lens for collimating the beams L1 and L2 in the parallel light beams emitted from the semiconductor laser array 1, and 3 designates a beam shaping prism for correcting distribution of elliptical strength of the respective collimated beams L1 and L2.

Reference numeral 4 designates a polarizing beam splitter, which is adapted to transmit therethrough the beams L1 and L2 having passed a beam shaping prism, toward an information recording medium (to be discussed below) and to reflect toward an error detecting system (to be discussed below) a recording reflected beam L1' and a reproducing reflected beam L2' from the information recording medium.

Reference numeral 5 designates a reflecting mirror, and 6 designates a ¼ wavelength plate, which are disposed on an optical path at the transmission side of the polarizing beam splitter 4.

Reference numeral 7 designates an objective lens for focusing on the information recording medium the beams L1 and L2 having passed the reflecting mirror 5 and ¼ wavelength plate 6 respectively, 8 designates an information recording medium comprising an optical disc rotatable around a rotary shaft 8a, and 9 designates an information track formed concentrically or spirally in the information recording medium 8.

Reference numeral 10 designates a convex lens disposed on an optical path at the reflection side of the polarizing beam splitter 4, and 11 designates a spatial filter disposed at the focal point of convex lens 10, which cuts off the recording reflected beam L1' reflected from the information recording medium 8 and allows only the reproducing reflected beam L2' to transmit through the lens 11.

Reference numeral 12 designates a beam splitter for dividing the reproducing reflected beam L2' having passed the spatial filter 11, toward a tracking error detection system and a focusing error detection system (both to be discussed below), 13 designates a two-divided photodetector for receiving the reproducing reflected beam L2' having passed the beam splitter 12, 14 designates a convex lens, 15 designates a knife edge, and 16 designates a two-divided photodetector for receiving the reproducing reflected beam L2' through the knife edge 15, which are disposed on the optical path at the reflection side of the beam splitter 12.

Reference 17 designates a differential amplifier which takes in a difference between the two signals output from the two-divided photodetector 13, 18 designates a tracking actuator for driving the objective lens 7 in the traversing direction (in the direction of the arrow T) with respect to the information track 9 on the basis of an output signal of the differential amplifier 17, 19 designates a differential amplifier which takes in a difference between the two signals output from the two-divided photodetector 16, and 20 designates a focusing actuator for driving the objective lens 7 in the vertical direction (in the direction of the arrow F) with respect to the surface of the information recording medium 8 on the basis of the output signal of the differential amplifier 19.

In addition, the two-divided photodetector 13 and differential amplifier 17 constitute the tracking error detection system for detecting a tracking error of the reproducing beam L2 irradiated to the information recording medium 8. The convex lens 14, knife edge 15, two-divided photodetector 16 and differential amplifier 19, constitute the focusing error detection system for detecting a focusing error of the reproducing beam L2.

Figure 10:
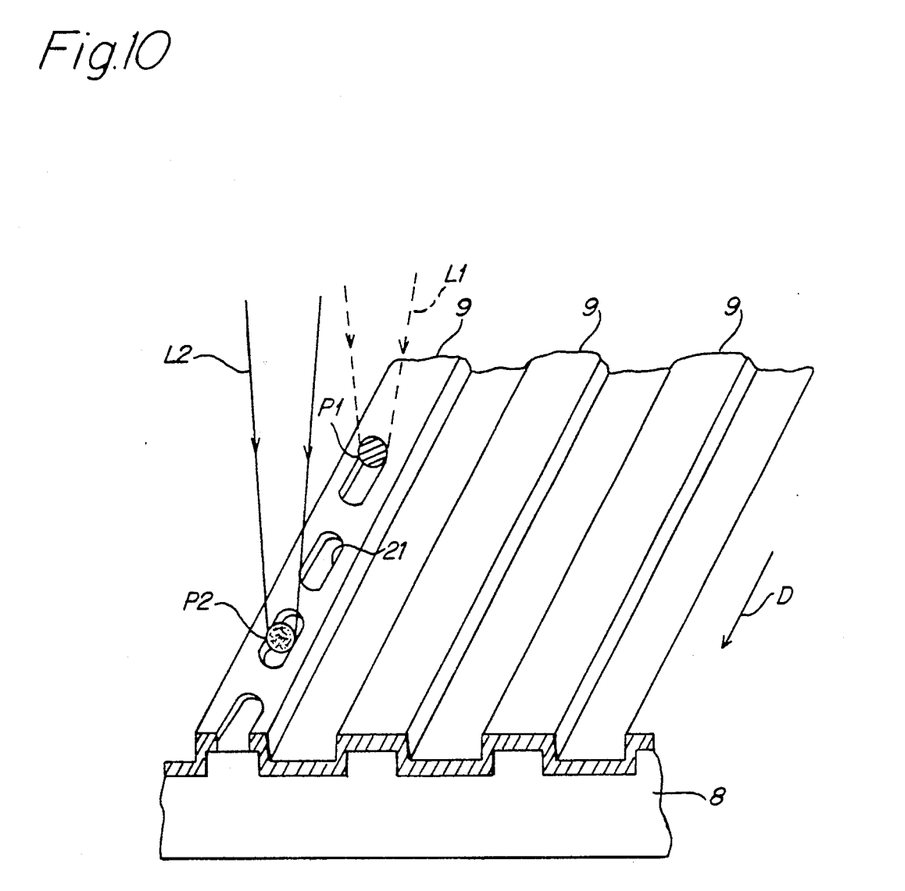
FIG. 10 is a perspective view explanatory of the irradiation state of the light beam with respect to an information recording medium.

FIG. 10 is an illustration showing the irradiation states of the respective light beams L1 and L2 with respect to the information track 9 in FIG. 9, in which reference numerals P1 and P2 designate two light spots, in other words, a recording spot and a reproducing spot, formed of the condensed beams L1 and L2, the arrow D designates the traveling direction by rotation of the information recording medium 8, and 21 designates a pit formed on the information track 9 by the recording spot P1.

Next, explanation will be given on operation of the conventional optical information recording/reproducing apparatus shown in FIGS. 9 and 10.

The recording beam L1 and reproducing beam L2 emitted from the semiconductor laser array 1 are collimated by the collimator lens 2 to the parallel light beams and further formed by the beam shaping prism 3 into two light beams having nearly symmetrical intensity-distribution with respect to the optic axis rotationally.

Next, the recording beam L1 and reproducing beam L2 are incident on the objective lens 7 through the polarizing beam splitter 4, reflection mirror 5 and ¼ wavelength plate 6 and focused on the information track 9 at the information recording medium 8 to be the recording spot P1 and reproducing spot P2.

The recording spot P1 in advance with respect to the rotation direction of the information recording medium 8 forms in order on the information track 9 the pits 21 modulated corresponding to the contents of information, the lagging reproducing spot P2 reproducing at the same time the content of information included in the recorded pit.

Continuously, the recording reflected beam L1' and reproducing reflected beam L2' reflected from the information recording medium 8 are again incident on the polarizing beam splitter 4 through the objective lens 7, ¼ wavelength plate 6 and reflection mirror 5. The reflected beams L1' and L2', which reciprocate through the ¼ wavelength plate 6 so as to rotate in the polarizing direction of 90°, are reflected at the polarizing beam splitter 4 and image-formed on the spatial filter 11 by the convex lens 10. In this case, only the reproducing reflected beam L2' passes through the spatial filter 11, is divided by the beam splitter 12, and received by the two-divided photodetectors 13 and 16.

Accordingly, the tracking error signal is detected by the push-pull method using the two-divided photodetector 13, the focusing error signal being detected by the knife-edge method using the knife edge 15 and the two-divided photodetector 16. The tracking error signal and focusing error signal thus obtained are amplified by the differential amplifiers 17 and 19 so as to drive the tracking actuator 18 and focusing actuator 20 respectively.

Also, the sum of output signals (not shown) of two-divided photodetector 13 is gained to detect the quantity of light of reproducing reflected beam L2' so as to reproduce the information signal recorded on the information track 9 at the information recording medium 8.

The conventional optical information recording/reproducing apparatus records and reproduces the information as the above-mentioned, in which it is generally known that when the push-pull method detects the tracking error signal, a tracking offset becomes larger.

Figure 11:
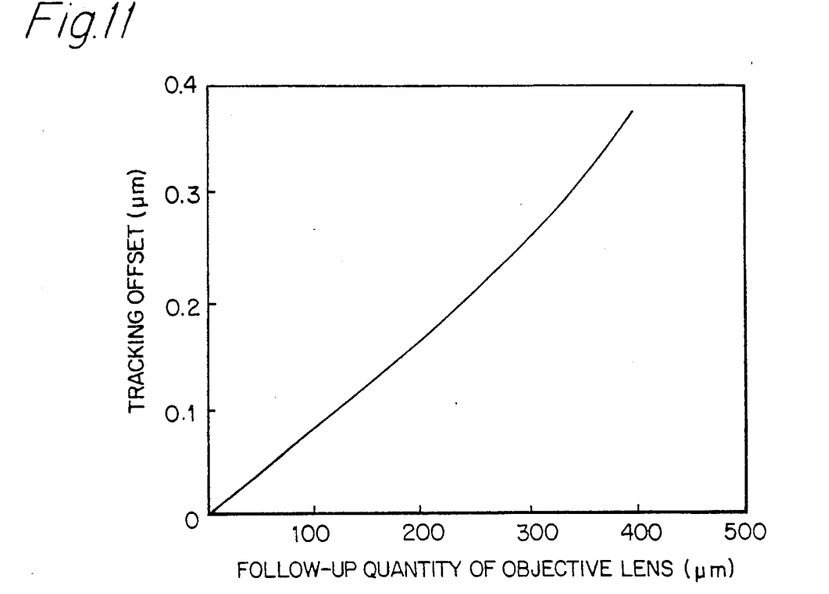
FIG. 11 is a characteristic graph showing the relation between the track follow-up quantity and a tracking offset.

FIG. 11 is a characteristic graph showing the relation between the follow-up quantity of the objective lens 7 with respect to the information track 9 and the tracking offset quantity, which is described in, for example, "Optical head for write-once disk with two perpendicular axes" of "Optical Memory Symposium" (in 1985, Pages 97 through 102), and which shows that, when a track follow-up amount of the objective lens 7 is 100 $\mu$m, the tracking offset is generated by only about 0.08 $\mu$m. Usually, a tolerance of tracking offset is about 0.05 to 0.1 $\mu$m so that it is seen that an offset value of 0.08 $\mu$m is about the limit of the tolerance.

Figure 12:
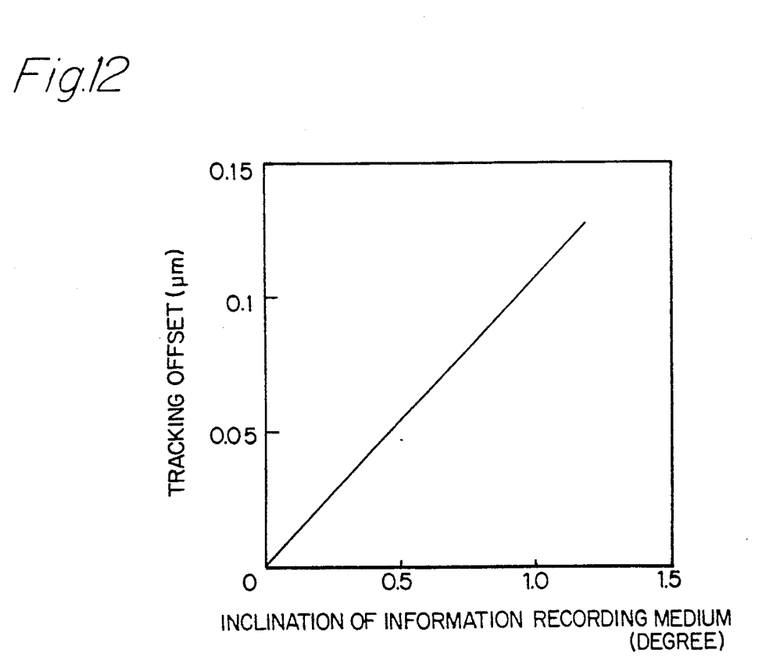
FIG. 12 is a characteristic graph showing the relation between the inclination of the information recording medium and the tracking offset.

FIG. 12 is a characteristic graph showing the relation between the inclination of the information recording medium 8 and the tracking offset quantity, which is described in Pages 224 through 229 of, for example, "On-land Composite Pregroove Method for High Track Density Recording" (by Y. Tsunoda et al), SPIE, Vol. 695, 1986. In this case, it is shown that the information recording medium 8 inclines at an angle of 1° to generate a tracking offset of 0.11 $\mu$m to exceed the aforesaid tolerance.

Now, when the radial wobbling method, instead of the push-pull method, is used for the tracking control, it is well-known that the aforesaid tracking offset problem is almost solved, the radial wobbling method including a spot-wobbling method of vibrating the reproducing light spot P2 and a track wobbling method of providing the wobble pit at the information track 9, which are quite equivalent in principle.

The spot-wobbling method has been described in the "Principles of Optical Disc System" [by G. Bouwhuis et al, Adam Hilger Ltd., 1985, Pages 73 through 75]. Also, it is reported by, for example, the "Composite Wobbled Tracking in the Optical Disc System" (by Ohtake et al, Pages 181 through 188, Optical Memory Symposium '85, 1985) that the tracking control by such radial wobbling method is hard to be affected by the inclination or the like of the information recording medium 8.

However, it is difficult to adopt the spot-wobbling method with respect to the conventional apparatus which emits the recording beam L1 and reproducing beam L2 from one light source 1 as shown in FIG. 9. Even when the track wobbling method is adopted, the wobble pits are periodically provided, whereby the tracking state of the light spot cannot always be detected.

Furthermore, the relative-positional relationship of the recording spot P1 is mechanically adjusted to coincide with the position of the reproducing spot P2, but in the conventional apparatus in FIG. 9, in spite of that one objective lens 7 focuses the recording beam L1 and reproducing beam L2 on the information recording medium 8, the focusing error signal and tracking error signal are obtained only from the reflected light of the reproducing spot P2. Accordingly, when the information recording medium 8 becomes eccentric to even slightly deteriorate the parallelism between the line connecting two light spots P1 and P2 and the information track 9, the tracking offset is generated at the recording spot P1.

The conventional optical information recording/reproducing apparatus, as above-mentioned, detects the tracking error signal by use of the push-pull method, thereby creating the problem in that the tracking offset generated by the track follow-up of objective lens 7 or the inclination of information recording medium 8 becomes larger. Also, since the focusing error signal and tracking error signal are obtained only from the reflected light of the reproducing spot P2, the information recording medium 8 is eccentric to deteriorate the parallelism between the line connecting the light spots P1 and P2 and the information track 9, thereby creating the problem in that the tracking offset is generated to make impossible the stable tracking control.

SUMMARY OF THE INVENTION

The invention has been achieved to solve the above-mentioned problems.

An object of the invention is to provide an optical information recording/reproducing apparatus which can reduce a tracking offset of the light spot caused by a track follow-up of an objective lens or an inclination of an information recording medium and perform stable tracking control.

Another object of the invention is to provide an optical information recording/reproducing apparatus which reduces a tracking offset of the light spot caused by a track follow-up of the objective lens, an inclination of the information recording medium, or eccentricity of the information recording medium, thereby enabling the tracking control to be stably performed.

The optical information recording/reproducing apparatus of the invention is provided with a plurality of light sources for separately emitting the recording beam and reproducing beam, wobbling means for minutely vibrating the reproducing light spot in the transverse direction of the information track, beam composing means for composing the recording beam and reproducing beam, and a tracking error detection system for obtaining the tracking error signal from the reproducing reflected beam by the spot-wobbling method.

An optical information recording/reproducing apparatus of another of the present invention is provided with a plurality of light sources, wobbling means, beam composing means, a first tracking error detection system for obtaining a tracking error signal St(R) from the reproducing reflected beam by the spot-wobbling method, and a second tracking error detection system for obtaining a tracking error signal St(W) on the basis of a tracking error signal S't(R) obtained from the reproducing reflected beam by the push-pull method and a tracking error signal S't(W) obtained from the recording reflected beam by the push-pull method.

In the present invention, the tracking control for the reproducing beam is performed on the basis of the tracking error signal.

In another embodiment of the present invention, the tracking control for the reproducing beam is performed on the basis of the tracking error signal St(R) and that for the recording beam is performed on the basis of the tracking error signal St(W).

The optical information recording/reproducing apparatus of the present invention is provided with the plurality of light sources for separately emitting the recording beam and reproducing beam, wobbling means for finely vibrating the reproducing light spot, beam composing means for composing the recording beam and reproducing beam, and tracking error detection systems for obtaining the tracking error signal from the reproducing reflected beam by the spot-wobbling method, so that the tracking control for the reproducing beam is performed on the basis of the tracking error signal, thereby having the effect that the tracking offset of the light spot caused by the track follow-up or the inclination of information recording medium, is reduced so as to stabilize the tracking control.

The optical information recording/reproducing apparatus of another of the invention is provided with a plurality of light sources, the wobbling means, beam composing means, a first tracking error detection system for obtaining the tracking error signal St(R) from the reproducing reflected beam by the spot-wobbling method, and a second tracking error detection system for obtaining the tracking error signal St(W) on the basis of the tracking error signal S't(R) obtained from the reproducing reflected beam by the push-pull method and of the tracking error signal S't(W) obtained from the recording reflected beam by the push-pull method, so that the tracking control for the reproducing beam on the basis of the tracking error signal St(R) and that for the recording beam is performed on the basis of the tracking error signal St(W), thereby being effective to reduce the tracking offset of the light spot caused by eccentricity or the like of the information recording medium and further stabilize the tracking control.

DESCRIPTION OF THE PREFERRED EMBODIMENTS OF THE INVENTION

Figure 1:
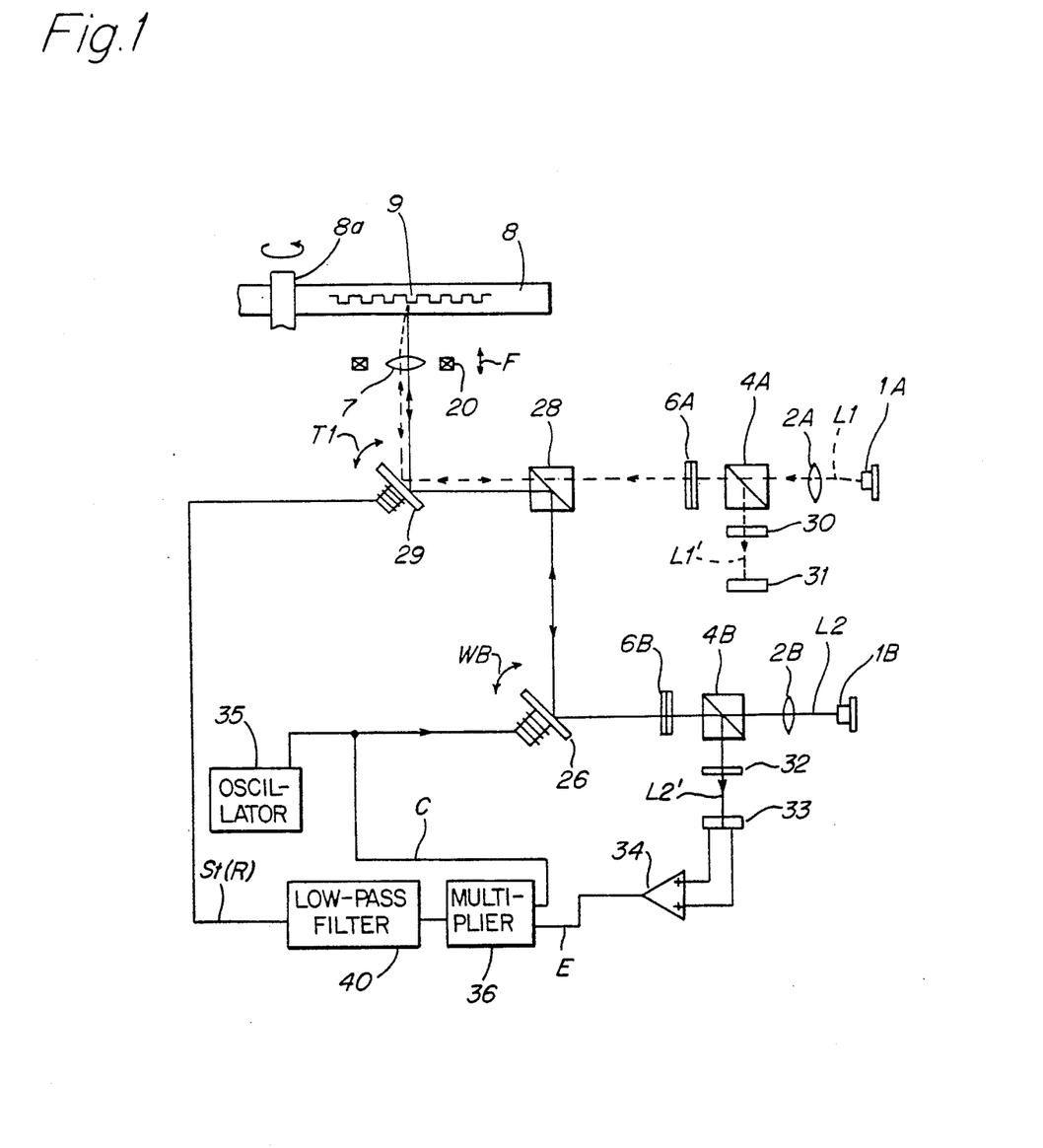
FIG. 1 is a structural view of an embodiment of an optical information recording/reproducing apparatus of the present invention.

FIG. 1 is an embodiment of an optical information recording/reproducing apparatus of the present invention, in which reference numerals 2A and 2B correspond to the aforesaid collimator lens 2 respectively, 4A and 4B to the aforesaid polarizing beam splitter 4 respectively, 6A and 6B to the aforesaid wavelength plate 6 respectively, 7 through 9 and 20 are the same as the aforementioned. Also, light spots P1 and P2 formed in the information recording medium 8 by the light beams L1 and L2 are in the state as shown in FIG. 10.

Reference numeral 1A designates a light source of a semiconductor laser emitting the recording beam L1 of a wavelength $\lambda_1$, and 1B designates a light source of a semiconductor laser emitting the reproducing beam L2 of a wavelength $\lambda_2$.

Reference numeral 26 designates a wobbling mirror, which is disposed on an optical path of the reproducing beam L2 passing the ¼ wavelength plate 6B and adopted to finely vibrate in the direction of the arrow WB corresponding to the transverse direction of information track 9.

Reference numeral 28 designates a dichroic beam splitter, which transmits therethrough the recording beam L1 of wavelength $\lambda_1$, and reflects the reproducing beam L2 of wavelength $\lambda_2$, is disposed at an intersection of the optical paths of the recording beam L1 passing the ¼ wavelength plate 6A and reproducing beam L2 reflected by the wobbling mirror 26, and constitutes beam composing means for composing the recording beam L1 and reproducing beam L2 to travel toward the information recording medium 8.

Reference numeral 29 designates a tracking mirror, which is disposed on the optical path of the two light beams L1 and L2 composed by the dichroic beam splitter 28, leads the light beams L1 and L2 toward the information recording medium 8, and rotates in the direction of the arrow T1 so as to tracking-control the reproducing beam L2.

Reference numeral 30 designates a wavelength filter for transmitting only the recording reflected beam L1' of wavelength $\lambda_1$, 31 designates a photodetector for receiving the recording reflected beam L1' passing the wavelength filter 30, 32 designates a wavelength filter for transmitting only the reproducing reflected beam L2' of wavelength $\lambda_2$, and 33 designates a two-divided photodetector for receiving the reproducing reflected beam L2' passing the wavelength filter 32.

Reference numeral 34 designates an adder which obtains the sum of signals from the two-divided photodetector 33 to output the sum signal E representing the total quantity of light, 35 designates an oscillator for outputting a predetermined frequency signal C to vibrate the wobbling mirror 26, and 36 designates a multiplier for multiplying the frequency signal C by the sum signal E.

Reference numeral 40 designates a low-pass filter which transmits the DC to low frequency component of the output of multiplier 36 and outputs the tracking error signal St(R) to the tracking mirror 29 and which constitutes a tracking error detection system for the reproducing beam L2 by the spot-wobbling method together with the two-divided photodetector 33, adder 34, oscillator 35 and multiplier 36.

Also, the wobbling mirror 26 and oscillator 35 constitute wobbling means for finely vibrating the reproducing light spot P2 in the transverse direction of the information track 9.

In addition, the focusing error detection system, which can be constituted on the basis of the well-known knife-edge method (refer to FIG. 9) or the astigmatism method, is not shown.

Next, explanation will be given on operation of the embodiment of the present invention shown in FIG. 1, with reference to FIG. 10.

In a case of usual information recording/reproducing operation, the recording beam L1 of wavelength $\lambda_1$ emitted from the light source 1A passes the collimator lens 2A, polarizing beam splitter 4A, ¼ wavelength plate 6A and dichroic beam splitter 28, and then is reflected by the tracking mirror 29 and further is focused on the information track 9 of the information recording medium 8 through the objective lens 7 to be a recording light spot P1, thereby forming a pit 21 to record the information.

Simultaneously, the recording beam L1 is reflected from the information recording medium 8 so as to be a recording reflected beam L1', which again passes the aforesaid optical system and is reflected by the polarizing beam splitter 4A and then passes the wavelength filter 30 to be received by the photodetector 31. The signal obtained therefrom may be used for real-time monitoring, for example, the recording state.

Also, the reproducing beam L2 of wavelength $\lambda_2$ emitted from the light source 1B passes the collimator lens 2B, polarizing beam splitter 4B and ¼ wavelength plate 6B and is reflected by the wobbling mirror 26 and further reflected by the dichroic beam splitter 28 so as to be composed with the recording beam L1. Thereafter, the composed reflected beam is focused through the same optical system on the information track 9 after recorded so as to be the reproducing light spot P2.

The reproducing beam L2' from the light spot P2 passes the aforesaid optical system and is reflected by the polarizing beam splitter 4B and received by the two-divided photodetector 33 through the wavelength filter 32, at which time the sum signal E from the adder 34 serves as a reproducing signal for the recorded information and is used to check simultaneously whether or not the recording spot P1 properly records the information during the information recording.

On the other hand, the sum signal E is input to the multiplier 36 and multiplied by the wobbling signal C to thereby be a tracking error signal St(R) through the low-pass filter 40, the tracking error signal St(R) driving the tracking mirror 29 which operates as the tracking actuator for the reproducing light spot P2, and tracking-controlling the reproducing beam L2.

Thus, since the spot-wobbling method carries out the tracking control for the reproducing light spot P2, no tracking offset occurs by the track follow-up of the objective lens 7 or the inclination of information recording medium 8.

In addition, in the embodiment of the present invention in FIG. 1, the tracking offset cannot be eliminated which is caused by deviation of parallelism between the line connecting the recording light spot P1 and the reproducing light spot P2 and the information track 9, whereby it is required that a relative positional error of the recording light spot P1 and reproducing light spot P2 is held at mechanical accuracy within the allowable range.

Next, explanation will be given on an embodiment of another of the present invention with reference to FIG. 2.

Figure 2:
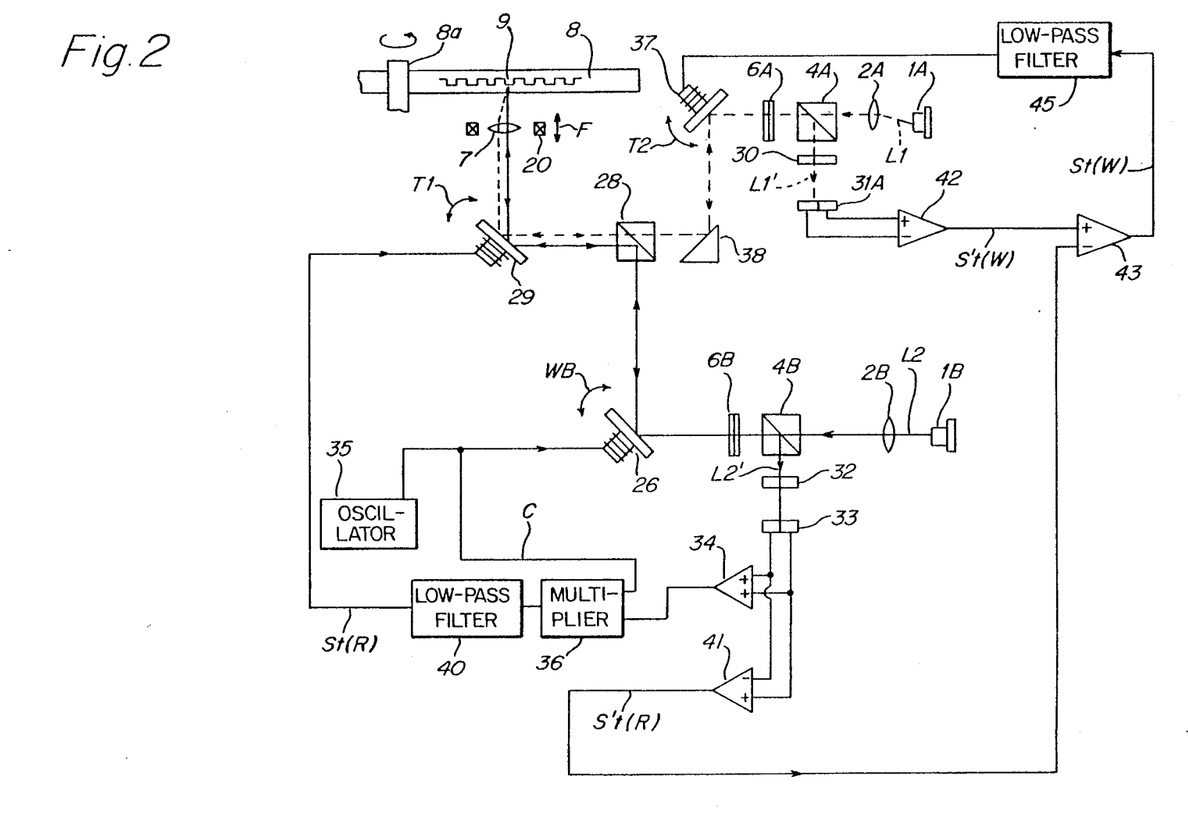
FIG. 2 is a structural view of an embodiment of the optical information recording/reproducing apparatus of another of the present invention.

FIG. 2 is a structural view thereof, in which reference numerals 26, 28 through 30, 32 through 36 and 40 are the same as those in the FIG. 1 embodiment.

Reference numeral 31A designates a second two-divided photodetector corresponding to the photodetector 31 in FIG. 1, 37 designates a tracking mirror which is disposed on the optical path of the recording beam L1 passing a ¼ wavelength plate 6A and rotates in the direction of the arrow T2 corresponding to the transverse direction of an information track 9 so as to tracking-control the recording beam L1, and 38 designates a reflector for deflecting toward the dichroic beam splitter 28 the recording beam L1 reflected by the tracking mirror 37.

Reference numeral 41 designates a first differential amplifier which amplifies a difference between the signals from the first two-divided photodetector 33 to output a tracking error signal S't(R) by the push-pull method, 42 designates a second differential amplifier which amplifies a difference between the signals from the second two-divided photodetector 31A so as to output a tracking error signal S't(W) by the push-pull method, 43 designates a third differential amplifier which amplifies a difference between the tracking error signals S't(R) and S't(W) so as to output a true tracking error signal St(W) of the recording light spot P1, and 45 designates a low-pass filter which allows the DC to low frequency component to transmit therethrough from the tracking error signal St(W) to thereby drive the tracking mirror 37.

The wavelength filters 30 and 32, two-divided photodetectors 31A and 33, and differential amplifiers 41 through 43, constitute a second tracking error detection system for obtaining the tracking error signal St(W) with respect to the recording light spot P1 on the basis of the tracking error signal S't(R) obtained from the reproducing reflected beam L2' and of the tracking error signal S't(W) obtained from the recording reflected beam L1'. Also, the differential amplifier 43, low-pass filter 45 and tracking mirror 37, constitute a tracking control system for the recording beam L1.

Next, explanation will be given on operation of the FIG. 2 embodiment with reference to FIG. 10.

The fundamental operation of the information recording and reproducing is the same as in FIG. 1 except that the tracking mirror 37 and reflector 38 are interposed on the optical paths of the recording beam L1 and recording reflected beam L1'.

Since the tracking control for the reproducing beam L2 is performed by the spot-wobbling method through the first tracking error detection system and tracking mirror 29, as the same as the above-mentioned, no tracking offset is created by the track follow-up of the objective lens 7 or the inclination of the information recording medium 8.

Meanwhile, the tracking control for the recording beam L1 is carried out as follows:

At first, the differential amplifier 42 amplifies a difference between the signals from the two-divided photodetector 31A so as to output the tracking error signal S't(W) regarding the recording beam L1 by the push-pull method, the tracking error signal S't(W), as shown in FIGS. 11 and 12, including the tracking offset component caused by the track follow-up of objective lens 7 and the inclination of information recording medium 8. Accordingly, when a tracking error component of the recording light spot P1 is represented by Δt(W) and a tracking offset component caused by the track follow-up or the inclination of information recording medium 8 is represented by δ, the tracking error signal S't(W) is given in the following equation:

$$S't(W) = \Delta t(W) + \delta \quad \text{①}$$

Also, the differential amplifier 41 outputs the tracking error signal S't(R) of the reproducing beam L2 by the push-pull method from the reproducing reflected beam L2', the tracking error signal S't(R) also including the tracking offset component the same as the above-mentioned. However, since the reproducing light spot P2 is properly controlled on the information track 9 by the tracking control due to the wobbling method, the tracking error signal S't(R) includes only the tracking offset component δ caused by the inclination of information recording medium 8. Accordingly, the signal S't(R) is given as follows:

$$S't(R) = \delta \quad \text{②}$$

Next, the tracking error signals S't(W) and S't(R) are input to the differential amplifier 43 so as to be the tracking error signal St(W), at which time the tracking error signal S't(R) based on the reproducing reflected beam L'2 is applied to the negative input terminal (−) of differential amplifier 43 so as to be the reference for the tracking error signal St(W) with respect to the recording beam L1. Accordingly, assuming that the tracking error signals S't(W) and S't(R) are equal in sensitivity to each other with respect to the track follow-up or the inclination of information recording medium 8, the tracking error signal St(W) output from the differential amplifier 43 is given in the following equation:

$$\begin{aligned} St(W) &= S't(W) - S't(R) \\ &= \Delta t(W) \end{aligned} \quad \text{③}$$

Hence, the tracking error signal St(W) depending only on the true tracking error quantity Δt(W) of the recording light spot P1 is obtained.

The tracking error signal St(W) is supplied to the tracking mirror 37 through the low-pass filter 45 so as to drivingly control in the direction of the arrow T2 the tracking mirror 37 functioning as the tracking actuator for the recording beam L1.

Generally, since the relative positional deviation of the recording light spot P1 and reproducing light spot P2 is caused by a change with the lapse of time in the mechanical system and optical system, the temperature change, or variation in mechanical dimension of the information recording mediums 8, the frequency component of the relative positional deviation following the rotation of information recording medium 8 may be deemed like DC. Accordingly, for stabilizing the servo loop, the low-pass filter 45 limits the band of tracking servo loop to be low.

Also, since the recording beam L1 and reproducing beam L2 use the objective lens 7 in common, the recording light spot P1 is controlled also by the tracking servo for the reproducing light spot P2 through the tracking mirror 29. Accordingly, for the recording beam L1, the tracking error signal St(W) according to the equation ③ need only be used to control the relative positional deviation of the recording light spot P1 with respect to the reproducing light spot P2 only perpendicular to the information track 9.

Another of the present invention can obtain the tracking error signals St(W) and St(R) which depend only on the tracking error with respect to the recording beam L1 and reproducing beam L2 and are scarcely affected by the inclination of information recording medium 8 or the track follow-up, whereby the tracking offset generated by the inclination of information recording medium 8 or the track follow-up is remarkably reducible.

Also, since the tracking servo is always applied to the recording beam L1 and reproducing beam L2, there is no fear that one light spot P1 or P2 causes the tracking error due to variation in the mechanical dimension between the information recording mediums 8, whereby the tracking offset generated by eccentricity of the information recording medium 8 is remarkably reducible.

In addition, in the aforesaid embodiments, it is described that the tracking error signals S't(W) and S't(R) are equal in sensitivity to each other with respect to the track follow-up or the inclination of information recording medium 8, the sensitivity actually varying in proportion to quantities of light receiving of photodetector 31A and 34. In order that this variation is suppressed and the sensitivity with respect to the tracking error or the inclination of information recording medium 8 depends not on the quantity of light receiving of the photodetectors 31A and 33, an automatic gain control unit, as shown in FIG. 3, is required to be inserted into the tracking servo loop.

Figure 3:
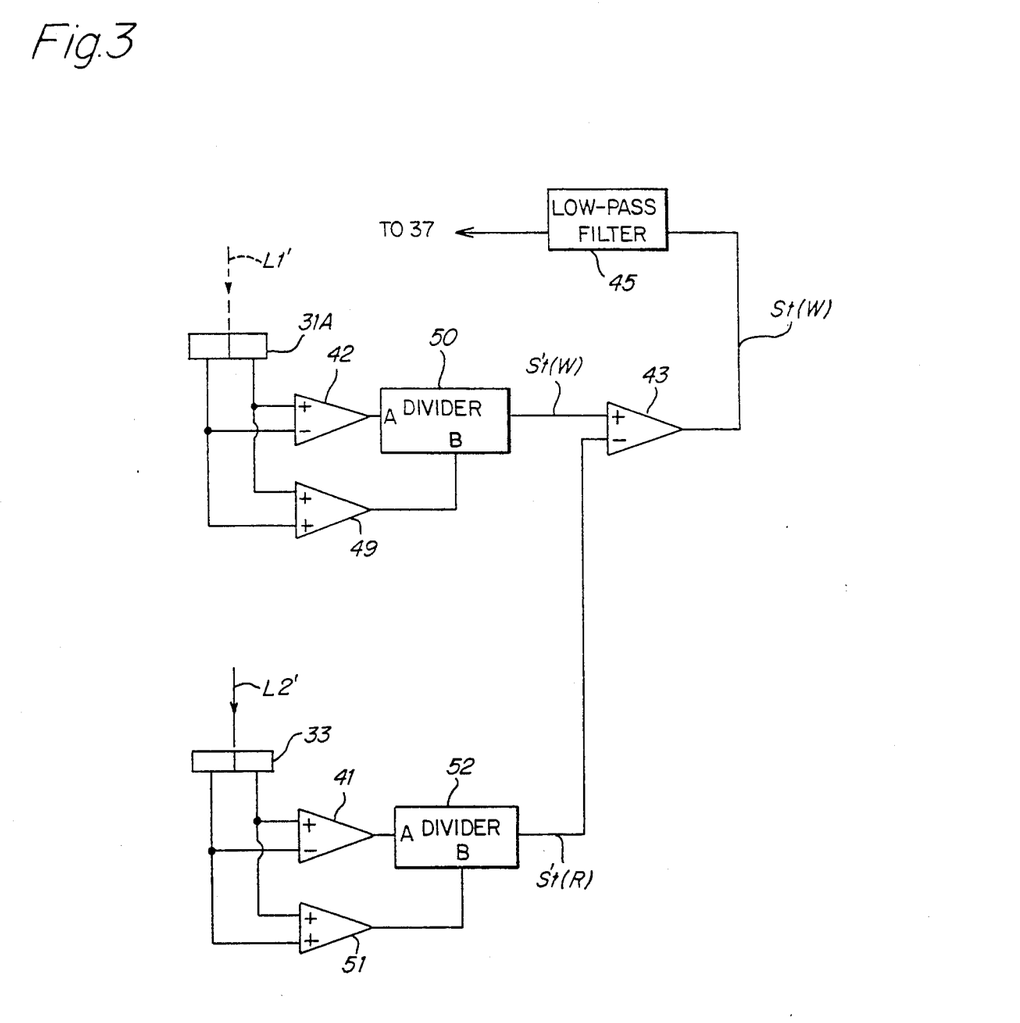
FIG. 3 is a partially structural view of a modified embodiment of the invention in FIG. 2, in which an automatic gain control unit is inserted in a tracking error detection system.

In FIG. 3, reference numeral 49 designates an adder which fetches the sum of signals from the two-divided photodetector 31A, 50 designates a divider which divides an output signal of a differential amplifier 42 applied to the input terminal A by the output signal of the adder 49 applied to the input terminal B and outputs the result of division as the tracking error signal S't(W), 51 designates an adder which fetches the sum of signals from a two-divided photodetector 33, and 52 designates a divider which divides by the output signal of the adder 51 applied to the input terminal B the output signal of the differential amplifier 41 applied to the input terminal A and which outputs the result of division as the tracking error signal S't(R).

Thus, the automatic gain control unit comprising the adders 49 and 51 and dividers 50 and 52 is inserted to enable the tracking error signals S't(W) and S't(R) depending not on the quantity of light receiving to be obtained.

Figure 4:
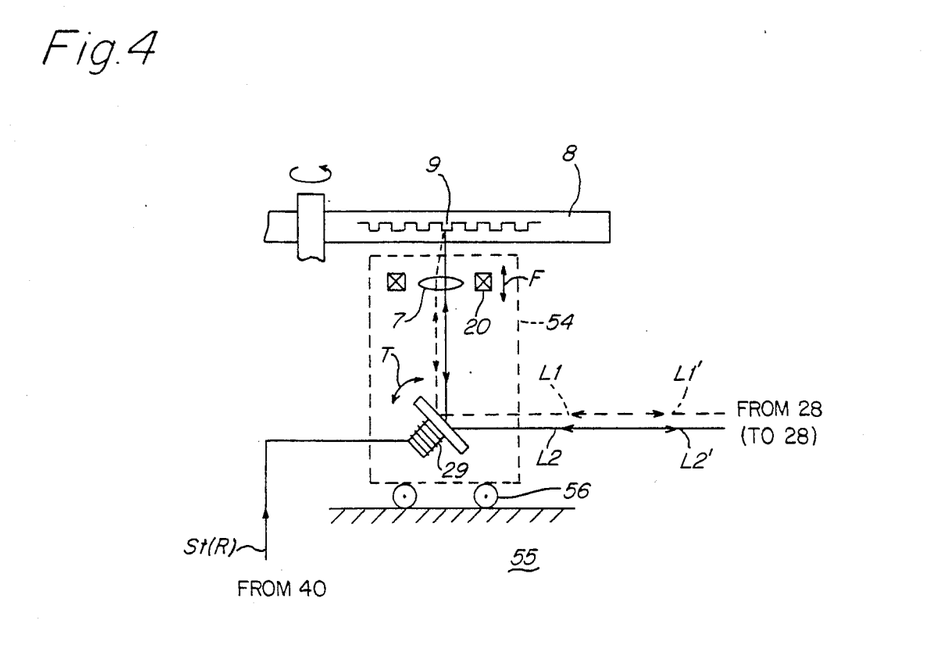
FIG. 4 is a partially structural view of another modified embodiment of the present invention in FIGS. 1 and 2, in which part of the optical system is formed in a movable unit.

Also, in the embodiments in FIGS. 1 and 2, the occurrences of the tracking offsets of light spots P1 and P2 are sufficiently reduced with respect to deviation of the optical axes between the irradiation light and reflected light caused by the inclination thereof or the track follow-up, so that, as shown in FIG. 4, the objective lens 7, focusing actuator 20 and tracking mirror 29 may alternatively be separated from the optical system body and formed in a movable unit 54 of integral construction and movable through a rotary shaft 56 with respect to base member 55. Therefore, since the movable unit 54 is reduced in weight, the light spots P1 and P2 are movable at high speed in the transverse direction of the information track 9, thereby reducing an access time in comparison with the case where the entire optical system is driven.

Figure 5:
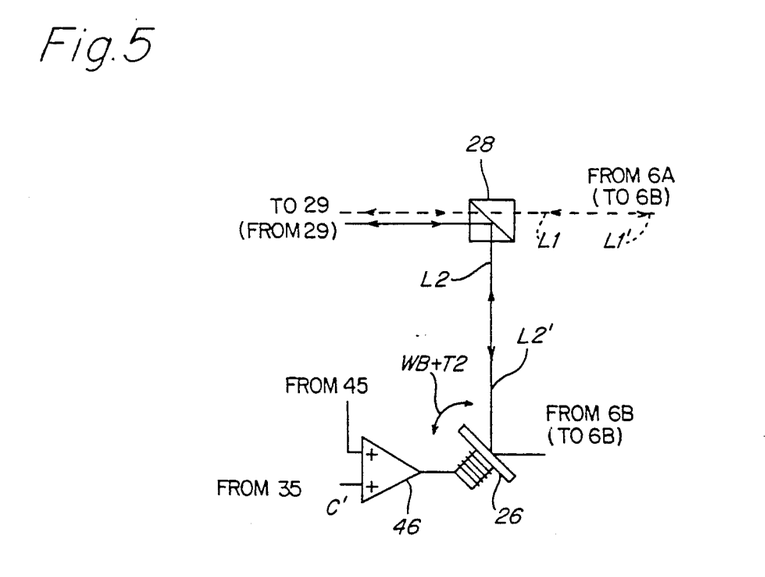
FIG. 5 is a partially structural view of still another modified embodiment of the invention in FIG. 2, in which a wobbling mirror is used also as a tracking mirror.

In the FIG. 2 embodiment, the tracking mirror 37 for the recording beam L1 and the wobbling mirror 26 for the reproducing beam L2 are provided separately from each other. Alternatively, an adder 46 may be inserted as shown in FIG. 5, so that the tracking mirror 37 may be omitted to allow the wobbling mirror 26 to function also as the tracking mirror 37. The reason for this is that the tracking control for the recording beam L1 is to control the relative positional deviation between the recording light spot P1 and the reproducing light spot P2 and its control region is an about DC region, but the wobbling frequency is several 10 kHz and higher at one digit than the frequency region of tracking control.

In FIG. 5, the adder 46 takes in the sum of wobbling signal C and a signal of low-pass filter 45 to drive the wobbling mirror 26. Accordingly, the wobbling mirror 26 is driven in the direction of the arrow (WB+T2) of adding the wobbling drive and relative tracking drive for the recording beam L1.

In this case, the tracking error signal St(W) having passed the low-pass filter 45 controls the reproducing beam L2, the tracking error signal St(W) corresponding to deviation of parallelism of the line connecting the recording light spot P1 and reproducing light spot P2 with respect to the information track 9, whereby the control for the reproducing beam L2 is substantially equal to control of the recording beam L1. Furthermore, quantity of error of the reproducing beam L2 is automatically corrected by the tracking mirror 29, thereby creating no problem.

Also, in the FIG. 2 embodiment, the tracking error signal St(R) for drivingly controlling the tracking mirror 29 is obtained from the low-pass filter 40. Alternatively, an adder 47 may be inserted as shown in FIG. 6 to compose the spot-wobbling method and the push-pull method to thereby tracking-control the reproducing beam L2.

Figure 6:
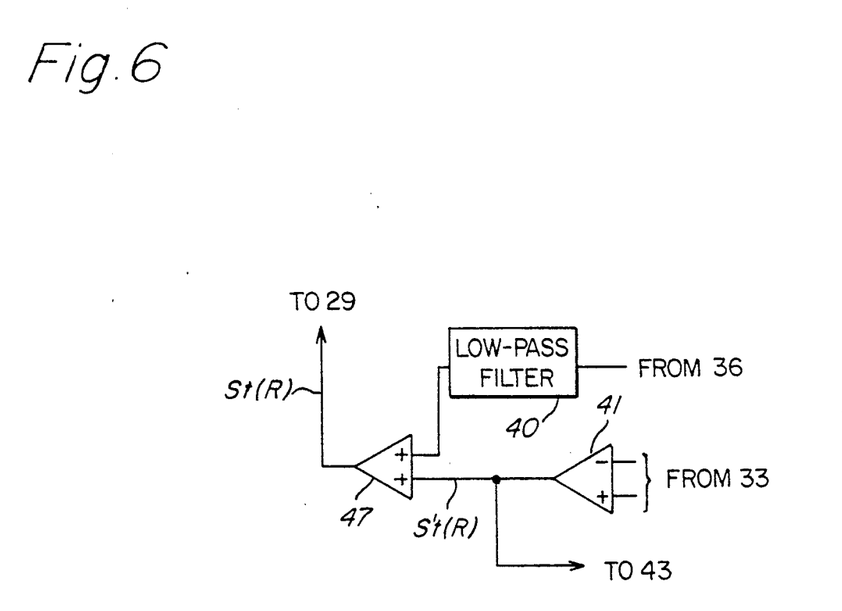
FIG. 6 is a partially structural view of a further modified embodiment of the invention in FIG. 2, in which a first tracking error detection system uses the spot-wobbling method and the push-pull method in combination.

In FIG. 6, the adder 47 sums the signal from the low-pass filter 40 and tracking error signal S't(R) from the differential amplifier 41 so as to use the sum signal as the tracking error signal St(R) for the reproducing beam L2. Accordingly, the band (zero to several 10 Hz) from DC to nearly the rotation frequency of information recording medium 8 is in charge of the tracking control system mainly for the spot wobbling, and a band (several 10 Hz to several kHz) more than the above is in charge mainly of the tracking control by the push-pull method.

At this time, in the low band, the level of tracking error signal S't(R) is sufficiently low in comparison with the output signal of low-pass filter 40, whereby the tracking control only by the spot-wobbling method is performed. Hence, the tracking offset caused by the inclination or eccentricity of information recording medium 8 or the track follow-up is suppressed by the track control system by the spot-wobbling method.

In the FIG. 2 embodiment, two beams of recording beam L1 of wavelength $\lambda_1$ and reproducing beam L2 of that $\lambda_2$ are used. Alternatively, multi-beams of three or more may be used as shown in FIG. 7.

Figure 7:
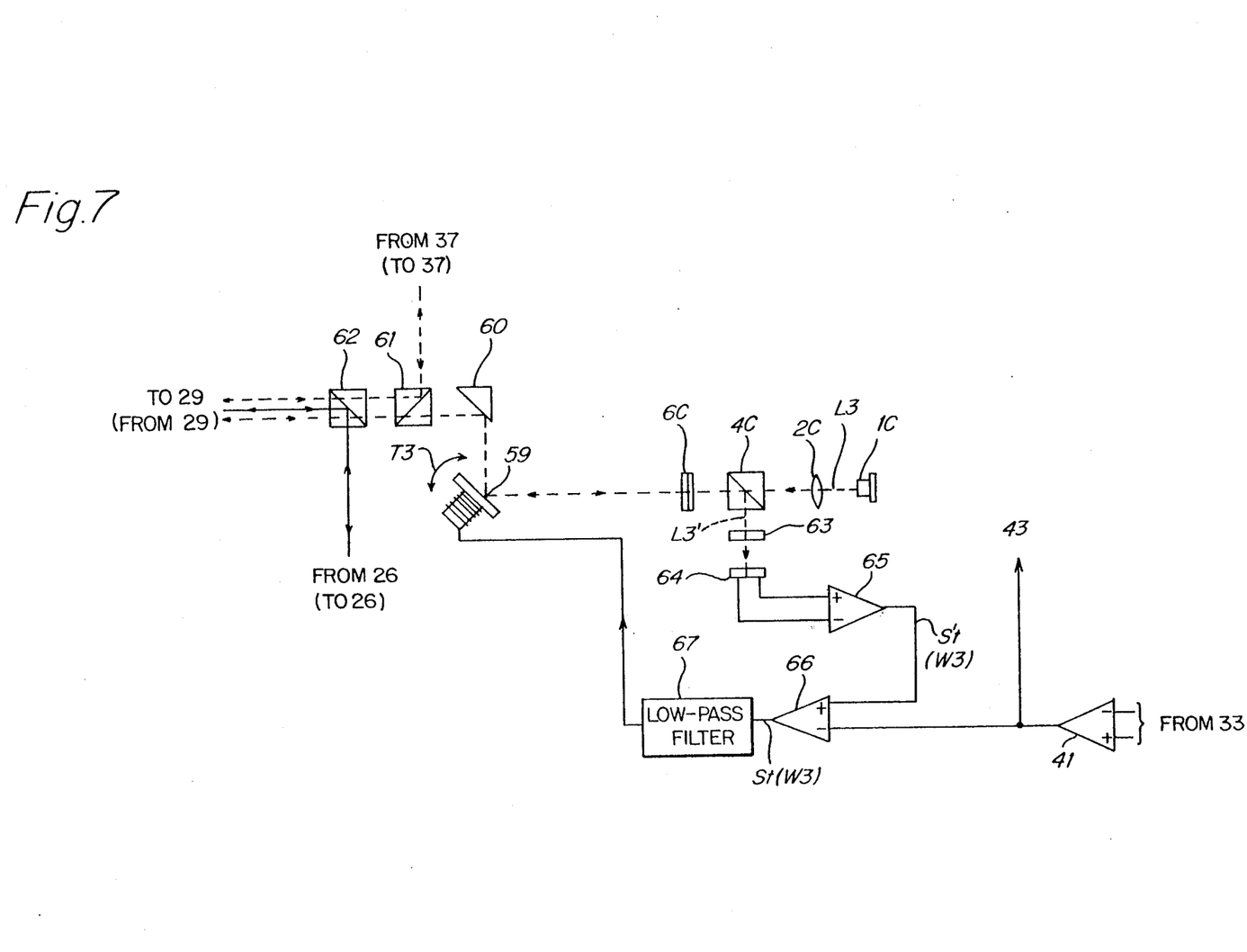
FIG. 7 is a partially structural view of a still further modified embodiment of the invention in FIG. 2, in which a recording light source is formed of multiple beams.

In FIG. 7, reference numeral 1C designates a light source, such as a semiconductor laser, for emitting a recording beam L3 of wavelength $\lambda_3$, 2C, 4C and 6C designate a collimator lens, a polarizing beam splitter and a ¼ wavelength plate, disposed in the order on the optical path of the recording beam L3 respectively, 59 designates a tracking mirror which rotates in the direction of the arrow T3 to tracking-control the recording beam L3, and 60 designates a reflector for converting the optical path of recording beam L3 through the tracking mirror 59.

Reference numeral 61 designates a dichroic beam splitter, which is disposed on the optical paths of the recording beams L1 and L3 and adapted to transmit the recording beam L3 of wavelength $\lambda_3$ and reflect the recording beam L1 of wavelength $\lambda_1$, 62 designates a dichroic beam splitter, which composes the recording beams L1 and L3 and reproducing beam L2, transmits the recording beams L1 of wavelength $\lambda_1$ and L3 of that $\lambda_3$, and reflects the reproducing beam L2 of wavelength $\lambda_2$.

Reference numeral 63 designates a wavelength filter which is disposed at the reflecting side of the polarizing beam splitter 4C and adapted to selectively transmit only a recording reflected beam L3' of wavelength $\lambda_3$, 64 designates a two-divided photodetector for detecting the tracking error signal for the recording beam L3, 65 designates a differential amplifier for taking in a difference between the signals from the two-divided photodetector 64, 66 designates a differential amplifier for taking in a difference between the tracking error signals S't(W3) and St'(R) from the differential amplifiers 41 and 65, and 67 designates a low-pass filter for passing the DC to low frequency component from the tracking error signal St(W3) obtained by the differential amplifier 66 to thereby drive the tracking mirror 59.

In this case, the wavelength filter 63, two-divided photodetector 64, and differential amplifier 65, constitute the tracking error detection system, the differential amplifier 66 and low-pass filter 67 constituting the tracking control system. The differential amplifiers 65 and 66 correspond to the differential amplifiers 42 and 43, the low-pass filter 67 corresponding to the low-pass filter 45, the tracking mirror 59 being drivingly controlled as the same as the tracking mirror 37.

Also, in the FIGS. 1 and 2 embodiments, the beams L1 and L2 from the recording optical system and reproducing optical system respectively are composed with each other by use of one dichroic beam splitter 28, so that the polarizing beam splitters 4A and 4B provided at the optical systems separate the irradiation light of the recording beam L1 and reproducing beam L2 from the reflected light of the recording reflected beam L1' and reproducing reflected beam L2'. Alternatively, as shown in FIG. 8, one polarizing beam splitter for separating the reflected light may be disposed on the optical path of the composed light beams L1 and L2 emitted from the light sources 1A and 1B respectively.

Figure 8:
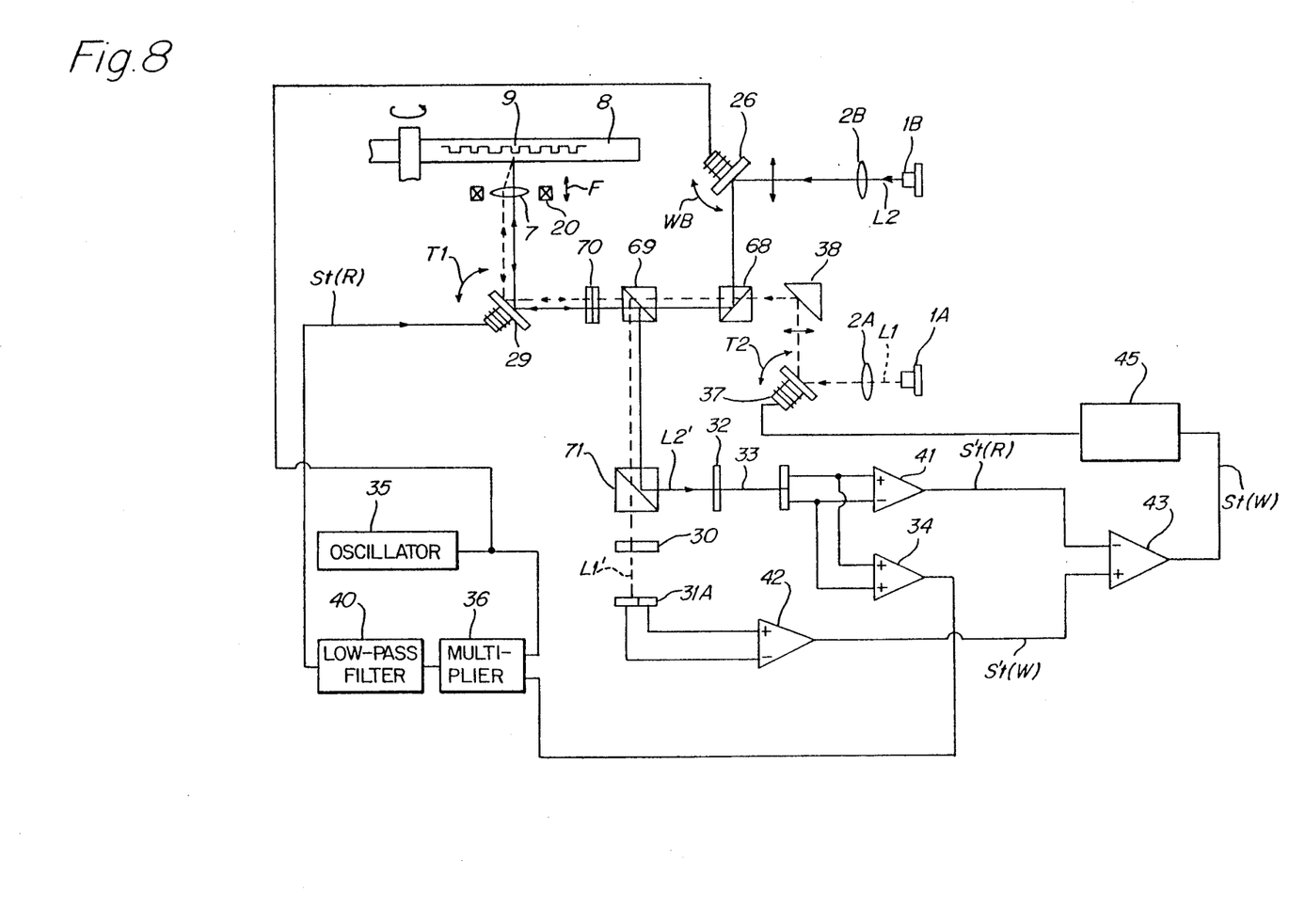
FIG. 8 is a structural view of still a further modified embodiment of the inventions in FIGS. 1 and 2, in which the optical systems are different.

Referring to FIG. 8, reference numeral 68 designates a dichroic beam splitter, which composes the recording beam L1 and reproducing beam L2, transmits the recording beam L1 of wavelength $\lambda_1$, and reflects the reproducing beam L2 of wavelength $\lambda_2$, and 69 designates a polarizing beam splitter for separating the irradiation light from the reflected light with respect to the information recording medium 8, which is adapted to transmit the irradiation light and reflect the reflected light and constitutes, together with the dichroic beam splitter 68, beam composing means.

Reference numeral 70 designates a ¼ wavelength plate disposed on the optical path between the polarizing beam splitter 69 and the tracking mirror 29, and 71 designates a dichroic beam splitter, which is disposed on the optical path at the reflecting side of the polarizing beam splitter 69, transmits the recording reflected beam L1', and reflects the reproducing reflected beam L2', thereby separately deflecting the reflected beams L1' and L2' from each other toward the tracking error detection systems thereof respectively.

In this case, since one polarizing beam splitter 69 is used in common, the polarizing directions of the irradiation lights L1 and L2, as shown in the arrows on the optical paths, are set in parallel to the drawing plane and the polarizing directions of the reflected lights L1' and L2' are perpendicular to the same respectively.

In construction shown in FIG. 8, the common section of the optical path is long, whereby relative variation in every light beam is reduced to enable the tracking control of high stability and reliability.

Furthermore, the embodiments in FIGS. 1 and 2 use the tracking controlling tracking mirror 29. Alternatively, a two-dimensional actuator capable of being driven also perpendicularly to the information track 9 may be used instead of the focusing actuator 20 and the tracking mirror 29 may be omitted.

POSSIBILITY OF INDUSTRIAL UTILIZATION

As seen from the above, the present invention is applicable not only to the optical information recording-/reproducing apparatus using an optical disc but also to an optical information recording/reproducing apparatus using an optical card or other optical recording media.

What is claimed is:

1. An optical information recording/reproducing apparatus which focuses a recording beam and a reproducing beam on an information track at an information recording medium by use of the same objective lens, forms a recording light spot and a reproducing light spot on said information recording medium, and performs tracking control for said reproducing beam and said recording beam on the basis of a reflected reproducing beam and a reflected recording beam reflected from said information recording medium, the optical information recording/reproducing apparatus comprising:
   a first light source for emitting said recording beam at a first wavelength;
   a second light source for emitting said reproducing beam at a second wavelength;
   wobbling means for finely vibrating said reproducing beam in the transverse direction of said information track,
   beam combining means for combining said recording beam and reproducing beam into a composite beam and directing said composite beam toward said information recording medium,
   a first tracking error detection system for obtaining a tracking error signal St(R) from said reflected reproducing beam by the spot-wobbling method, and
   a second tracking error detection system for obtaining a tracking error signal St(W) with respect to said recording beam on the basis of a tracking error signal S't(R) obtained from said reflected reproducing beam reflected from said information recording medium by the push-pull method and a tracking error signal S't(W) obtained from said reflected recording beam reflected from said information recording medium by the push-pull method,
   said tracking control for said reproducing beam being performed on the basis of said tracking error signal St(R) and said tracking control for said recording beam being performed on the basis of said tracking error signal St(W).

2. An optical information recording/reproducing apparatus as set forth in claim 1, wherein said wobbling means is provided with a wobbling mirror disposed on the light path of said reproducing beam and with an oscillator for vibrating said wobbling mirror on a predetermined frequency.

3. An optical information recording/reproducing apparatus as set forth in claim 2, wherein said wobbling means is provided with a low-pass filter which allows the DC to low frequency component from the tracking error signal St(W) to pass, and with an adder which takes in the sum of an output signal from said low-pass filter and an output signal from said oscillator, said wobbling mirror is driven by an added signal of said output signal and said tracking error signal St(W) through said low-pass filter.

4. An optical information recording/reproducing apparatus as set forth in any one of claims 1 through 3, wherein said beam combining means is a dichroic beam splitter which transmits one of said recording beam and reproducing beam reflects the other.

5. An optical information recording/reproducing apparatus as set forth in any one of claim 1 through 3, wherein said recording beam and reproducing beam have the same polarization direction, and said beam combining means is provided with a dichroic beam splitter which transmits one of said recording beam and reproducing beam and reflects the other and with a polarization beam splitter for separating the irradiating light and the reflected light from each other relating to said information recording medium.

6. An optical information recording/reproducing apparatus as set forth in claim 1 wherein said first tracking error detection system is provided with a first two-divided photodetector for receiving said reflected reproducing beam and with a first adder for taking in the sum of signals from said first two-divided photodetector, said second tracking error detection system is provided with a first differential amplifier which amplifies a difference between the signals from said first two-divided photodetector and outputs a tracking error signal S't(R), a second two-divided photodetector for receiving said reflected recording beam, a second differential amplifier which amplifies a difference between the signals from said second two-divided photodetector and outputs a tracking error signal S't(W), and a third differential amplifier which amplifies a difference between said tracking error signals S't(W) and S't(R) and outputs said tracking error signal St(W).

7. An optical information recording/reproducing apparatus as set forth in claim 6, wherein said first tracking error detection system is provided with an adder which takes in the sum of said tracking error signal obtained by the spot-wobbling method and tracking error signal S't(R) from said first differential amplifier, so that an output of said adder is used as said tracking error signal St(R).

8. An optical information recording/reproducing apparatus as set forth in any one of claims 2, 3, 6, or 7, wherein said objective lens, tracking mirror and focusing actuator are formed in a movable unit of integral construction, and separated from a base member of the optical system.

9. An optical information recording/reproducing apparatus which uses an objective lens to focus plural recording beams and a reproducing beam onto an information track of an information recording medium to form recording light spots and a reproducing light spot, respectively thereon, and which performs tracking control of the said reproducing beam and said recording beams in accordance with a reflected reproducing beam and a reflected recording beam, respectively, reflected from said information recording medium, said apparatus comprising:
   a first light source for emitting a first recording beam at a first wavelength;
   a second light source for emitting said reproducing beam at a second wavelength;
   a third light source for emitting a second recording beam at a third wavelength;
   wobbling means for vibrating said reproducing beam in a direction transverse to said information track;
   beam combining means for combining said first and second recording beams and said reproducing beam into a composite beam and directing said composite beam toward said information recording medium;
   a first tracking error detection system for obtaining a tracking error signal St(R) from the reflected reproducing beam by a spot-wobbling method,
   a second tracking error detection system for obtaining a tracking error signal St(W) with respect to said first recording beam in accordance with a tracking error signal S't(R) obtained from the reflected reproducing beam reflected from said information recording medium by the push-pull method, and a tracking error signal S't(W) obtained from a first reflected recording beam reflected from said information recording medium by the push-pull method;
   a third tracking error detection system for obtaining a tracking error signal St(W3) with respect to said second recording beam in accordance with a tracking error signal S't(R) obtained from the reflected reproducing beam reflected from said information recording medium by the push-pull method, and a tracking error signal S't(W3) obtained from a second reflected recording beam reflected from said information recording medium by the push-pull method; and
   said tracking control for said reproducing beam being performed in accordance with said tracking error signal St(R), said tracking control for said first recording beam being performed on the basis of said tracking error signal St(W), and said tracking control for said second recording beam being performed on the basis of said tracking error signal St(W3).

10. An optical information recording/reproducing apparatus as set forth in claim 9 wherein said first tracking error detection system comprises a first two-divided photodetector for receiving said reproducing reflected beam and a first adder for taking in the sum of signals from said two-divided photodetector and outputting the sum as said tracking error signal St(R).

11. An optical information recording/reproducing apparatus as set forth in claim 10 wherein said second tracking error detection system comprises a first differential amplifier which amplifies a difference between the signals from said first two-divided photodetector and outputs a tracking error signal S't(R), a second two-divided photodetector for receiving said first reflected recording beam, a second differential amplifier which amplifies a difference between the signals from said second two-divided photodetector and outputs a tracking error signal S't(W), and a third differential amplifier which amplifies a difference between said tracking error signals S't(W) and S't(R) and outputs said tracking error signal St(W).

12. An optical information recording/reproducing apparatus as set forth in claim 11 wherein said third tracking error detection system comprises a third two-divided photodetector for receiving said second reflected recording beam, a fourth differential amplifier which amplifies a difference between the signals from said third two-divided photodetector and outputs a tracking error signal S't(W3), and a fifth differential amplifier which amplifies the difference between said tracking error signal S't(W3) and S't(R) and outputs said tracking error signal St(W3).

13. An optical information recording/reproducing apparatus as set forth in claim 9, wherein said wobbling means is provided with a wobbling mirror disposed on the light path of said reproducing beam and with a oscillator for vibrating said wobbing mirror on a predetermined frequency.

14. An optical information recording/reproducing apparatus as set forth in claim 13, wherein said wobbling means is provided with a low-pass filter which allows the DC to low frequency component from the tracking error signal St(W) to pass, and with an adder which takes in the sum of an output signal from said low-pass filter and an output signal from said oscillator, said wobbling mirror is driven by an added signal of said output signal and said tracking error signal St(W) through said low-pass filter.

15. An optical information recording/reproducing apparatus as set forth in claim 9, wherein said beam combining means comprises:
   a first dichroic beam splitter which forms a composite recording beam by transmitting one of said first recording beam and said second recording beam and reflecting the other; and
   a second dichroic beam splitter which forms a composite beam by transmitting one of said composite recording beam and said reproducing beam and reflecting the other.

16. An optical information recording/reproducing apparatus as set forth in claim 15, wherein said composite recording beam and said reproducing beam have the same polarization direction, and said beam composing means further comprises a polarization beam splitter for separating the irradiating light and the reflected light from each other.

17. An optical information recording/reproducing apparatus as set forth in any one of claim 9 through 12, wherein said objective lens, tracking mirror and focusing actuator are formed in a movable unit of integral construction and separated from a base member of the optical system.

18. An optical information recording/reproducing apparatus as set forth in claims 1 or 7 wherein
said first tracking error detection system includes
a first two-divided photodetector for receiving the reflected reproducing beam, and
a first adder to add the output signals from said first two-divided photodetector;
said second tracking error detection system includes
a first differential amplifier which outputs the difference of the output signals from said first two-divided photodetector,
a first divider which divides the output signal of said first differential amplifier by the output signal of said adder and outputs a quotient as said tracking error signal S't(R),
a second two-divided photodetector for receiving the reflected recording beam from said recording spot,
a second adder to add the output signals from said second two-divided photodetector,
a second divider which divides the output signal of said second differential amplifier by the output signals of said second adder and outputs a quotient as said tracking error signal S't(W) and
a third differential amplifier which amplifies a difference between said tracking error signal S't(W) and S't(R) and outputs said difference as said tracking error signal St(W).

19. An optical information recording/reproducing apparatus as set forth in claim 9, wherein said first tracking error detection system is provided with an adder which takes in the sum of said tracking error signal obtained by the spot-wobbling method and tracking error signal S't(R) from said first differential amplifier, so that an output of said adder is used as said tracking error signal St(R).

* * * * *